United States Patent
Xue

(10) Patent No.: US 9,256,738 B2
(45) Date of Patent: Feb. 9, 2016

(54) SYSTEMS AND METHODS FOR PRE-INSTALLATION DETECTION OF MALWARE ON MOBILE DEVICES

(71) Applicant: Symantec Corporation, Mountain View, CA (US)

(72) Inventor: Yong Ling Xue, Beijing (CN)

(73) Assignee: Symantec Corporation, Mountain View, CA (US)

( * ) Notice: Subject to any disclaimer, the term of this patent is extended or adjusted under 35 U.S.C. 154(b) by 38 days.

(21) Appl. No.: 14/205,316

(22) Filed: Mar. 11, 2014

(65) Prior Publication Data

US 2015/0261954 A1 Sep. 17, 2015

(51) Int. Cl.
*G06F 11/00* (2006.01)
*G06F 21/55* (2013.01)
*G06F 21/56* (2013.01)
*H04W 12/12* (2009.01)
*H04L 29/08* (2006.01)
*G06F 21/57* (2013.01)
*H04L 29/06* (2006.01)
*H04W 4/00* (2009.01)

(52) U.S. Cl.
CPC ............ *G06F 21/554* (2013.01); *G06F 21/564* (2013.01); *H04W 12/12* (2013.01); *G06F 21/57* (2013.01); *H04L 63/145* (2013.01); *H04L 63/1416* (2013.01); *H04L 67/34* (2013.01); *H04W 4/001* (2013.01); *H04W 4/003* (2013.01)

(58) Field of Classification Search
USPC ....................................... 726/23, 24; 713/188
See application file for complete search history.

(56) References Cited

U.S. PATENT DOCUMENTS

| | | | |
|---|---|---|---|
| 8,819,772 B2* | 8/2014 | Bettini et al. | 726/1 |
| 8,839,433 B2* | 9/2014 | O'Reirdan et al. | 726/24 |
| 2009/0100519 A1 | 4/2009 | Tarbotton et al. | |
| 2009/0282485 A1* | 11/2009 | Bennett | 726/24 |
| 2010/0263048 A1* | 10/2010 | Chang et al. | 726/23 |
| 2013/0067577 A1* | 3/2013 | Turbin et al. | 726/24 |
| 2013/0185799 A1 | 7/2013 | Pfeifer et al. | |

OTHER PUBLICATIONS

Zheng, Lin "Detecting a Malware Application Prior to Installation in an Android Device", Symantec Corporation, IP.com Journal, (Apr. 30, 2012).

* cited by examiner

*Primary Examiner* — Christopher Brown
(74) *Attorney, Agent, or Firm* — ALG INTELLECTUAL PROPERTY, LLC

(57) ABSTRACT

A computer-implemented method for pre-installation detection of malware on mobile devices may include intercepting one or more communications of an application installation agent that installs applications on a mobile computing device. The method may further include identifying, based on the one or more intercepted communications, an application that has been at least partially downloaded by the application installation agent. The method may also include, in response to identifying the application, and before the application is installed on the mobile computing device, scanning the application for malware. The method may additionally include determining, based on the scan, that the application contains malware. The method may finally include performing a security action in response to determining that the application contains malware. Various other methods, systems, and computer-readable media are also disclosed.

20 Claims, 6 Drawing Sheets

SYSTEMS AND METHODS FOR PRE-INSTALLATION DETECTION OF MALWARE ON MOBILE DEVICES

BACKGROUND

Protecting mobile devices from malware is an integral part of mobile device security. As a result, security software developers are continuously seeking ways to improve the speed, efficiency, and efficacy of mobile device anti-malware systems. Many anti-malware systems detect malware by scanning files for known malware signatures. If an anti-malware system detects code within a file that matches a known malware signature, the anti-malware system may then perform a variety of security actions, such as quarantining or deleting the file. At this point, unfortunately, the malware file may have already compromised the security of the mobile device. This may prove especially true when malware is downloaded by app store clients (e.g. GOOGLE PLAY clients or IOS APP STORE clients). For example, traditional anti-malware systems on a smartphone may wait to scan an application until after an app store client has downloaded and installed the application on the smartphone. This window of time between installation and scanning, no matter how small, may be enough for malware to compromise the security of the smartphone.

What is needed, therefore, is a more efficient and effective mechanism for pre-installation detection of malware on mobile devices.

SUMMARY

As will be described in greater detail below, the instant disclosure describes various systems and methods for pre-installation detection of malware on mobile devices. For example, a method for pre-installation detection of malware on mobile devices may include intercepting one or more communications of an application installation agent that installs applications on a mobile computing device. The method may further include identifying, based on the one or more intercepted communications, an application that has been at least partially downloaded by the application installation agent. The method may also include, in response to identifying the application and before the application is installed on the mobile computing device, scanning the application for malware. The method may additionally include determining, based on the scan, that the application contains malware. The method may further include performing a security action in response to determining that the application contains malware.

In some embodiments, a monitoring agent may launch the application installation agent such that the monitoring agent is capable of intercepting communications from the application installation agent. In these embodiments, after launching the application installation agent, the monitoring agent may perform the intercepting and identifying steps described above.

In at least one embodiment, intercepting the one or more communications of the application installation agent may include intercepting a request from the application installation agent to download the application from a remote server. In some examples, intercepting the one or more communications of the application installation agent may include intercepting a request by the application installation agent to install the application on the mobile computing device. In these examples, identifying the application may include identifying the file path for the application based on the request to install the application on the mobile computing device. In some embodiments, identifying the application may further include providing the file path to a scanning agent that performs the scanning step.

In various examples, scanning the application may include scanning the application while the application is downloading and/or after the application has fully downloaded. In at least one example, performing the security action may include blocking installation of the application.

In one embodiment, a system for implementing the above-described method may include an interception module, stored in memory, that intercepts one or more communications of an application installation agent that installs applications on a mobile computing device. The system may further include an identification module, stored in memory, that identifies, based on the one or more intercepted communications, an application that has been at least partially downloaded by the application installation agent. The system may also include a scanning module, stored in memory, that scans the application before the application is installed on the mobile computing device. The system may additionally include a determination module, stored in memory, that determines, based on the scan, that the application contains malware. The system may further include a security module, stored in memory, that performs a security action in response to determining that the application contains malware. In addition, the system may include at least one physical processor that executes the interception module, the identification module, the scanning module, the determination module, and the security module.

In some examples, the above-described method may be encoded as computer-readable instructions on a non-transitory computer-readable medium. For example, a computer-readable medium may include one or more computer-executable instructions that, when executed by at least one processor of a mobile computing device, may cause the mobile computing device to intercept one or more communications of an application installation agent that installs applications on the mobile computing device. The one or more computer-executable instructions may further cause the mobile computing device to identify, based on the one or more intercepted communications, an application that has been at least partially downloaded by the application installation agent. The one or more computer-executable instructions may also cause the mobile computing device to scan the application for malware before the application is installed on the mobile computing device. The one or more computer-executable instructions may additionally cause the mobile computing device to determine, based on the scan, that the application contains malware. The one or more computer-executable instructions may further cause the mobile computing device to perform a security action in response to determining that the application contains malware.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
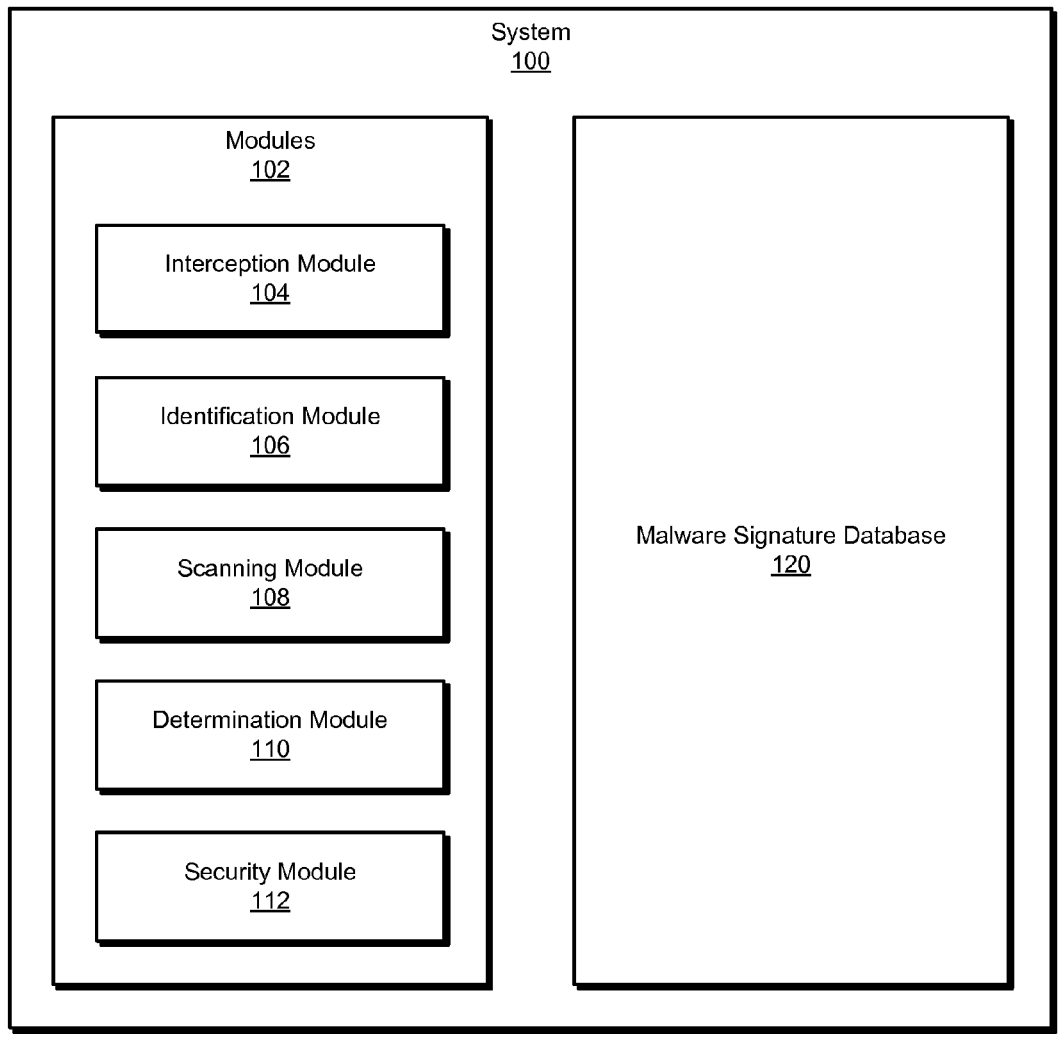
FIG. 1 is a block diagram of an exemplary system for pre-installation detection of malware on mobile devices.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for pre-installation detection of malware on mobile devices. As will be explained in greater detail below, the systems and methods described herein may intercept communications of an application installation agent in order to detect malware before it is installed on a mobile computing device. Specifically, by intercepting requests from an application installation agent to download an application and/or install an application, scanning the application for malware, and then blocking installation of the application, the systems and methods herein may help antimalware developers create robust, pro-active anti-malware systems.

Figure 2:
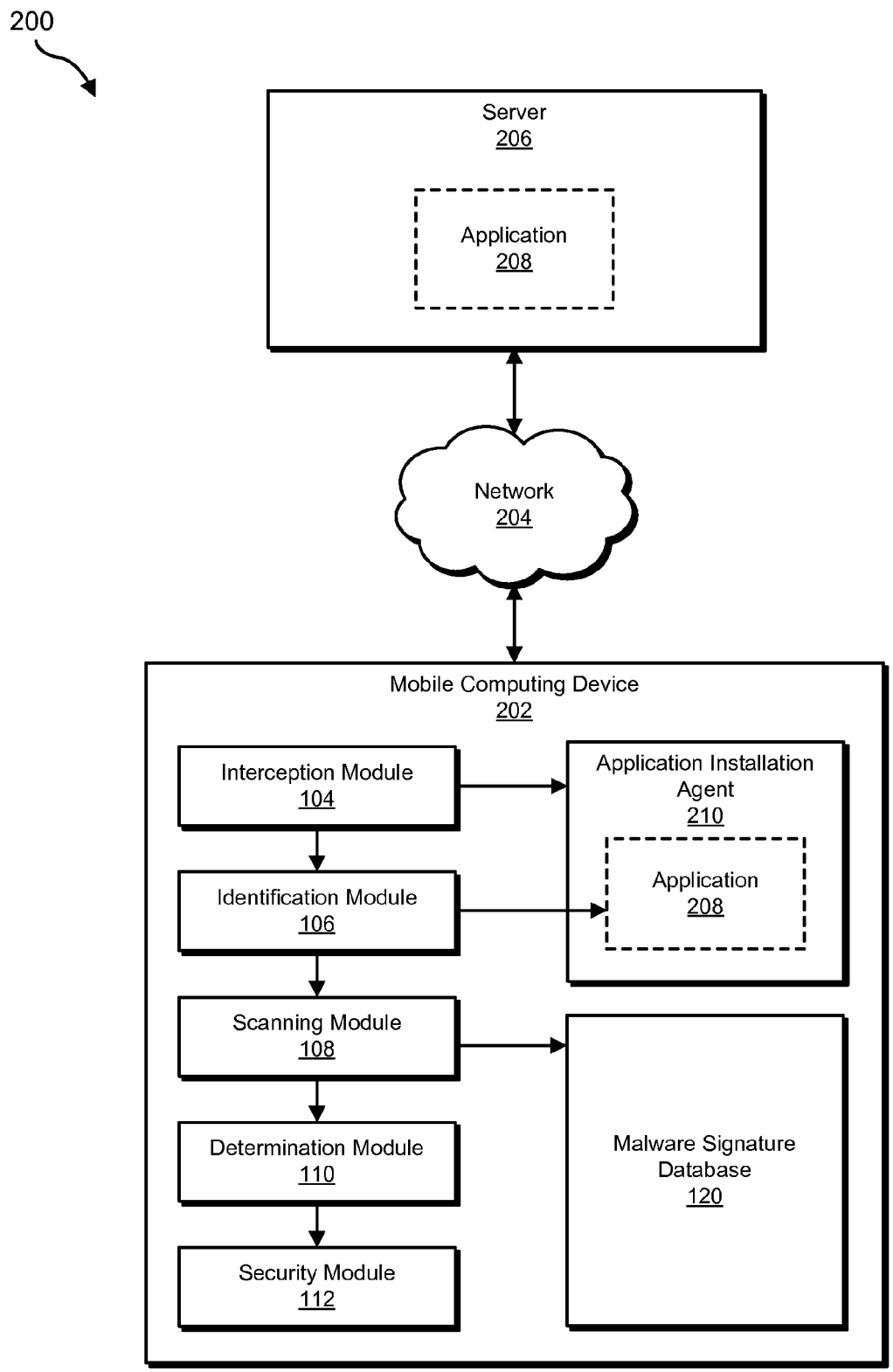
FIG. 2 is a block diagram of an additional exemplary system for pre-installation detection of malware on mobile devices.
Figure 3:
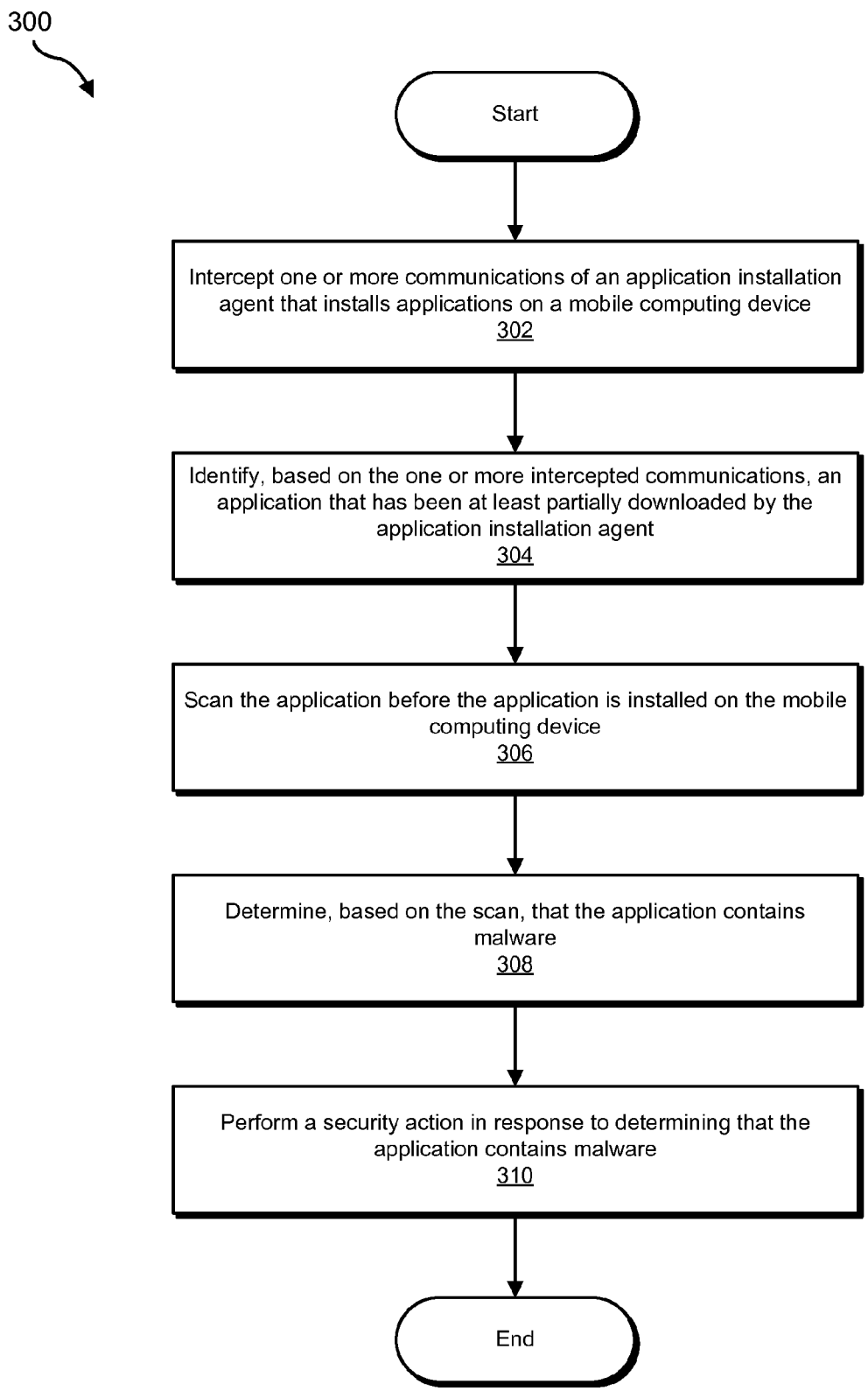
FIG. 3 is a flow diagram of an exemplary method for pre-installation detection of malware on mobile devices.
Figure 4:
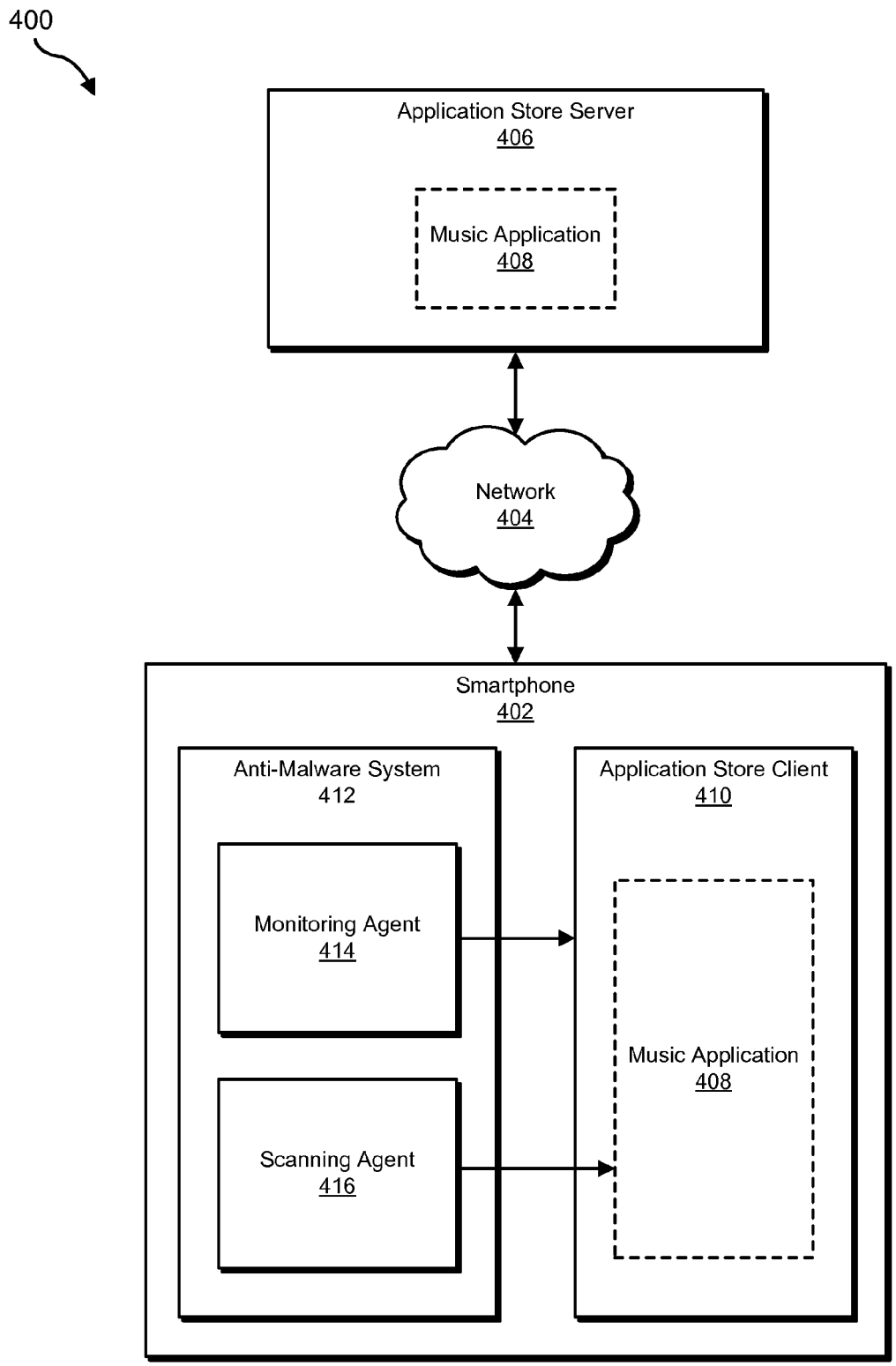
FIG. 4 is a block diagram of an exemplary system for pre-installation detection of malware on a smartphone.

The following will provide, with reference to FIGS. 1, 2, and 4, detailed descriptions of exemplary systems for pre-installation detection of malware on mobile devices. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for pre-installation detection of malware on mobile devices. As illustrated in this figure, exemplary system 100 may include one or more modules 102 for performing one or more tasks. For example, and as will be explained in greater detail below, exemplary system 100 may include an interception module 104 that intercepts one or more communications of an application installation agent that installs applications on a mobile computing device. Exemplary system 100 may also include an identification module 106 that identifies, based on the one or more intercepted communications, an application that has been at least partially downloaded by the application installation agent. Exemplary system 100 may further include a scanning module 108 that, in response to identifying the application, and before the application is installed on the mobile computing device, scans the application for malware.

Exemplary system 100 may additionally include a determination module 110 that determines, based on the scan, that the application contains malware. Exemplary system 100 may also include a security module 112 that performs a security action in response to determining that the application contains malware. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., mobile computing device 202 and/or server 206), smartphone 402 in FIG. 4, computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as malware signature database 120. In one example, malware signature database 120 may be configured to store a variety of known malware signatures. In this example, an anti-malware system may scan files on a mobile computing device to detect malware signatures similar to those found in malware signature database 120. In this way, an anti-malware system (e.g., anti-malware system 412 in FIG. 4) may utilize malware signature database 120 to detect malware on a mobile computing device.

Malware signature database 120 may represent portions of a single database or computing device or a plurality of databases or computing devices. For example, malware signature database 120 may represent a portion of server 206 in FIG. 2, smartphone 402 in FIG. 4, computing system 510 in FIG. 5, and/or portions of exemplary network architecture 600 in FIG. 6. Alternatively, malware signature database 120 in FIG. 1 may represent one or more physically separate devices capable of being accessed by a computing device, such as server 206 in FIG. 2, smartphone 402 in FIG. 4, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may include a mobile computing device 202 in communication with a server 206 via a network 204. In one example, mobile computing device 202 may be programmed with one or more of modules 102 and/or may store all or a portion of the data in malware signature database 120. Additionally or alternatively, server 206 may be programmed with one or more of modules 102 and/or may store all or a portion of the data in malware signature database 120.

In one embodiment, one or more of modules 102 from FIG. 1 may, when executed by at least one processor of mobile computing device 202 and/or server 206, enable mobile computing device 202 and/or server 206 to scan and detect malware before it is installed on mobile computing device 202. For example, and as will be described in greater detail below, interception module 104 may intercept one or more communications of an application installation agent 210 that installs applications on mobile computing device 202. Identification module 106 may then identify, based on the one or more intercepted communications, an application 208 that has been at least partially downloaded by application installation agent 210. In response to identification module 106 identifying application 208, and before application 208 is installed on mobile computing device 202, scanning module 108 may scan application 208 for malware. Determination module 110 may then determine, based on the scan of application 208, that application 208 contains malware. Finally, security module 112 may perform a security action in response to determining that application 208 contains malware.

Mobile computing device 202 generally represents any type or form of computing device capable of reading computer-executable instructions. Examples of mobile computing device 202 include, without limitation, laptops, tablets, cellular phones, Personal Digital Assistants (PDAs), multimedia players, embedded systems, wearable devices (e.g., smart watches, smart glasses, etc.), gaming consoles, combinations of one or more of the same, smartphone 402 in FIG. 4, exemplary computing system 510 in FIG. 5, or any other suitable computing device.

Server 206 generally represents any type or form of computing device capable of hosting and providing applications to app store clients installed on mobile devices. For example, server 206 may be part of the GOOGLE PLAY service and may allow smartphones configured with a GOOGLE PLAY client to download GOOGLE PLAY applications. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network 404 in FIG. 4, exemplary network architecture 600 in FIG. 6, or the like. Network 204 may facilitate communication or data transfer using wireless or wired connections. In one embodiment, network 204 may facilitate communication between mobile computing device 202 and server 206.

FIG. 3 is a flow diagram of an exemplary computer-implemented method 300 for pre-installation detection of malware on mobile devices. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, smartphone 402 in FIG. 4, computing system 510 in FIG. 5, and/or portions of exemplary network architecture 600 in FIG. 6.

As illustrated in FIG. 3, at step 302 one or more of the systems described herein may intercept one or more communications of an application installation agent that installs applications on a mobile computing device. For example, interception module 104 may, as part of mobile computing device 202 in FIG. 2, intercept one or more communications of application installation agent 210.

As used herein, the term "communication" generally refers to any type or form of input/output sent from or received by a process, application, software module, and/or program. In addition, the term "communication" may generally refer to any type or form of interaction between two software modules, such as communications exchanged via Application Programming Interface (API) calls or via other communication protocols (FTP, HTTPS, etc). In some examples, a communication may include attempts by an application process to read or write data to or from a storage device. For example, an application installation agent may call a system API to store and/or install applications on a smartphone storage device. Communications may include any other suitable interactions, input/output, and/or data sent from and/or received by any type of software.

A variety of information and/or data may be sent via a communication. For example, an executable file or script may be sent from an application store server to an application store client on a smart phone. In another example, an application installation agent may call an API on a remote server by sending specific parameters to the API. Examples of data that may be sent via a communication may include, without limitation, any type or form of application files (e.g., android package files (APKs) or iPhone application archives (IPAs)), executables, scripts, libraries, API parameters, protocol parameters, database files, compressed files, input/output data, or any other suitable type or form of data.

A communication between two software modules (such as an application installation agent and an API on a remote server) may be sent via a variety of protocols. For example, an application installation agent and a remote server may communicate via Hyper Text Transfer Protocol (HTTP) or File Transfer Protocol (FTP). In some examples, processes within the same system may communicate via system-specific protocols. For example, applications on ANDROID devices may communicate with each other and other system processes via a variety of ANDROID specific protocols and parameters, such as, e.g., an "intent" declaration.

The phrase "application installation agent," as used herein, generally refers to any type or form of application store client installed on a mobile computing device that is configured to download and install applications to the mobile computing device from a remote server (e.g., GOOGLE PLAY clients or IOS APP STORE clients). For example, an application installation agent may include a client-side smartphone app that allows a user of the smartphone to search for and download applications from an application store. An application installation agent may include any other suitable service, app, and/or software module that generally automates the process of downloading and installing applications on a mobile device.

An application installation agent may be configured to download and install a variety of applications and files (e.g., ANROID APKs or IOS IPAs) from a remote server that hosts applications. Additionally, an application installation agent may be configured to communicate with a remote server via a variety of protocols (as discussed above) across a variety of networks and network configurations. For example, an application installation agent may be configured to download and install applications via the internet, a cellular network, or any other suitable type of network.

Interception module 104 may intercept one or more communications of application installation agent 210 in a variety of ways. For example, interception module 104 may intercept a request from application installation agent 210 to download application 208 from server 206. In some embodiments, interception module 104 may intercept a request by application installation agent 210 to install application 208 on mobile computing device 202. For example, on ANDROID devices, interception module 104 may intercept a request to install application 208 by intercepting "intent" declarations sent from application installation agent 210.

In various embodiments, interception module 104 may be part of a monitoring agent (such as monitoring agent 414 in FIG. 4). In these embodiments, the monitoring agent may launch application installation agent 210 such that the monitoring agent is capable of intercepting communications from application installation agent 210. For example, a monitoring agent that is part of an anti-malware system on a smartphone may launch and set permissions for an application store client installed on the smartphone. Configurations such as this may enable the monitoring agent to perform various monitoring tasks, such as hooking the input/output of application installation agent 210. In at least one embodiment, the monitoring agent may be configured to interrupt and redirect attempts to launch application installation agent 210. For example, when a smartphone user attempts to launch an application store client, a monitoring agent may interrupt the launch attempt and then re-launch the application store client as a process that the monitoring agent can monitor.

As illustrated in FIG. 3, at step 304 one or more of the systems described herein may identify, based on the one or more intercepted communications, an application that has been at least partially downloaded by the application installation agent. For example, identification module 106 may, as part of mobile computing device 202 in FIG. 2, identify application 208 based on the one or more communications intercepted by interception module 104. In addition, application 208 may have been at least partially downloaded by application installation agent 210.

As used herein, the term "application" generally refers to any type or form of executable file and/or process. For example, an application may include APK or IPA files. An application may be any size. For example, an application may be as large as a 100 megabytes or as small as a few kilobytes. In some examples, an application may include one or more files that can be installed in a variety of configurations on mobile computing device 202. In some examples, an application may include files that can be installed at the system and application level of a mobile computing device 202.

Identification module 106 may identify application 208 in a variety of ways. For example, identification module 106 may identify application 208 while application installation agent 210 is downloading application 208 from server 206. In some embodiments, identification module 106 may identify application 208 after application installation agent 210 requests to install application 208 on mobile computing device 202. In at least one example, identification module 106 may identify application 208 by identifying a file path for application 208 based on the request by application installation agent 210 to install application 208 on mobile computing device 202. In various embodiments, identification module 104 may then send the file path for application 208 to a scanning agent that performs the scanning step (e.g., scanning module 108 in FIG. 2 or scanning agent 416 in FIG. 4). In these embodiments, the scanning agent may use the file path for application 208 to locate and scan application 208.

In various embodiments, identification module 106 may be part of a monitoring agent. In these embodiments, the monitoring agent may launch application installation agent 210 in such a way that the monitoring agent is able to identify applications that have been at least partially downloaded by application installation agent 210. For example, a monitoring agent may, when launching application installation agent 210, set permissions that allow the monitoring agent to identify attempts by application installation agent 210 to download and/or install application 208.

Identification module 106 may identify application 208 at any suitable time before application 208 is installed. For example, identification module 106 may identify application 208 while application installation agent 210 is downloading application 208. In another example, identification module 106 may identify application 208 after application installation agent 210 has fully downloaded application 208.

At illustrated in FIG. 3, at step 306, one or more of the systems described herein may, in response to identifying the application, and before the application is installed on the mobile computing device, scan the application for malware. For example, scanning module 108 may, as part of mobile computing device 202 in FIG. 2, scan application 208 for malware. In addition, scanning module 108 may scan application 208 before application installation agent 210 installs application 208 on mobile computing device 202.

Scanning module 108 may scan application 208 using a variety of malware scanning methods. Examples of malware scanning methods may include, without limitation, string scanning methods, wildcards methods, mismatches methods, generic detection methods, bookmarks methods, smart scanning methods, skeleton detection methods, heuristics analysis, virus specific detection, and/or any other suitable malware scanning process.

Scanning module 108 may scan application 208 in a variety of ways. For example, scanning module 108 may scan application 208 while application installation agent 210 downloads application 208. In some embodiments, scanning module 108 may scan application 208 after application installation agent 210 has fully downloaded application 208. In at least one example, scanning module 108 may scan application 208 in response to an attempt by application installation agent 210 to install application 208. In various examples, scanning module 108 may scan application 208 immediately after identification module 106 identifies application 208.

According to some embodiments, scanning module 108 may scan application 208 using a signature matching method. In these embodiments, scanning module 108 may scan application 208 to find matches to know malware signatures, such as malware signatures stored in malware signature database 120.

As illustrated in FIG. 3, at step 308 on or more of the systems described herein may determine, based on the scan, that the application contains malware. For example, determination module 110 may determine that application 208 contains malware based on the scan of application 208.

As user herein, the term "malware" generally refers to any type or form of code, script, application, software module, process, and/or any other type of computer executable instruction configured to behave in generally hostile, intrusive, unsafe, undesirable, and/or malicious way. For example, malware may include a spyware program on a smartphone that collects sensitive or private data. In another example, malware may include a malicious computer virus that attempts to disrupt computer operations by performing malicious functions, such as, e.g., deleting files or corrupting system processes. General examples of malware may include, without limitation, computer viruses, ransomware, worms, trojan horses, rootkits, keyloggers, dialers, spyware, adware, rogue security software, malicious Browser Helper Objects (BHOs), and or any suitable type or form of malware.

Determination module 110 may determine that application 208 contains malware in a variety of ways. For example, determination module 110 may determine that application 208 contains malware if any code within application 208 is similar to or matches known malware signatures, such as those stored in malware signature database 120. In some embodiments, determination module 110 may determine that application 208 contains malware if at least one computer-executable instruction of application 208 matches a malware signature. In some examples, determination module 110 may determine that application 208 is, in and of itself, a malware program. In at least one example, determination module 110 may determine that application 208 contains malware if any part or portion of application 208 is suspected of being malware, regardless of whether that part or portion of application 208 is malware or not. For example, determination module 110 may use a heuristic algorithm to make an informed "guess" or determination that application 208 contains malware. Determination module 110 may determine that application 208 contains malware in any other suitable way.

As illustrated in FIG. 3, at step 310, one or more of the systems described herein may perform a security action in response to determining that the application contains malware. For example, security module 112 may, as part of mobile computing device 202, perform a security action.

As used herein, the phrase "security action," when used with reference to the instant disclosure, generally refers to any steps taken by a software module (such as security module 112) to improve the security of a mobile computing device. For example, an anti-malware system may perform a security action by attempting to quarantine a file after determining that the file contains malware. Examples of security actions may include, without limitation, creating security logs, quarantining or deleting files that contain malware, notifying a user of a mobile device about malware detected on the device, blocking installation of malware, and/or any other suitable step or action that attempts to improve the security of a mobile device.

Security module 112 may perform a variety of security actions when determination module 110 determines that application 208 contains malware. For example, security module 112 may quarantine or delete application 208. In another example, security module 112 may alert a user of mobile computing device 202 that application 208 contains malware. In some embodiments, security module 112 may store information about application 208 to in a security log. In various embodiments, security module 112 may perform a combination of security actions. For example, security module 112 may quarantine application 208 and then notify a user of mobile computing device 202 that application 208 contains malware.

In at least one example, security module 112 may block installation of application 208. For example, security module 112 may block an attempt by application installation agent 210 to install application 208 on mobile computing device 202. In another example, security module 112 may prevent application installation agent 210 from even attempting to install application 208.

As briefly mentioned above, method 300 may be incorporated in an anti-malware system stored on a smartphone. System 400 in FIG. 4 is an exemplary illustration an anti-malware system 412 that is configured with all of modules 102 and stored on smartphone 402. In this illustration, anti-malware system 412 includes a monitoring agent 414 and a scanning agent 416. When a user of smartphone 402 attempts to launch application store client 410, monitoring agent 414 may redirect the attempt and launch application store client 410 into a process that monitoring agent 414 can monitor. By doing so, monitoring agent 414 may be able to intercept communications sent from and/or received by application store client 410, such as attempts to download and install music application 408.

In this illustration, monitoring agent 414 may hook an input/output process of application store client 410 and therefore detect that application store client 410 is downloading music application 408 from application store server 406 via network 404. Monitoring agent 414 may identify and provide a file path for music application 408 to scanning agent 416 and then instruct scanning agent 416 to scan music application 408. In this example, scanning agent 416 may be a malware scanning module that is configured to use the file path to locate files and then determine whether the files contain malware by using a signature match scanning method.

Scanning agent 416 may then scan music application 408 (either while music application 408 is downloading or after music application 408 has been fully downloaded) and may determine that music application 408 contains malware. At this point, scanning agent 416 may notify anti-malware system 412 that application 408 contains malware. Anti-malware system 412 may, in response, block any attempt by application store client 410 to install music application 408. Anti-malware system 412 may also report the incident in a security log and then notify a user of smartphone 402 that music application 408 contains malware.

As explained above in connection with method 300 in FIG. 3, app store clients may compromise the security of a mobile device by installing an application onto a mobile device before the application has been scanned for malware. While some solutions may attempt to address this problem by scanning the application immediately after installation, they fail to address the potentially serious issue that malware, even when installed for a short time, may severely compromise the security of a mobile device.

The instant disclosure may overcome this problem by scanning an application for malware before the application is installed on a mobile device. Specifically, by hooking the input/output of an application store client, identifying an application, and then scanning the application for malware, the systems and methods described herein may detect malware before it is installed on a mobile device, thus preventing a host of potentially serious security issues.

Figure 5:
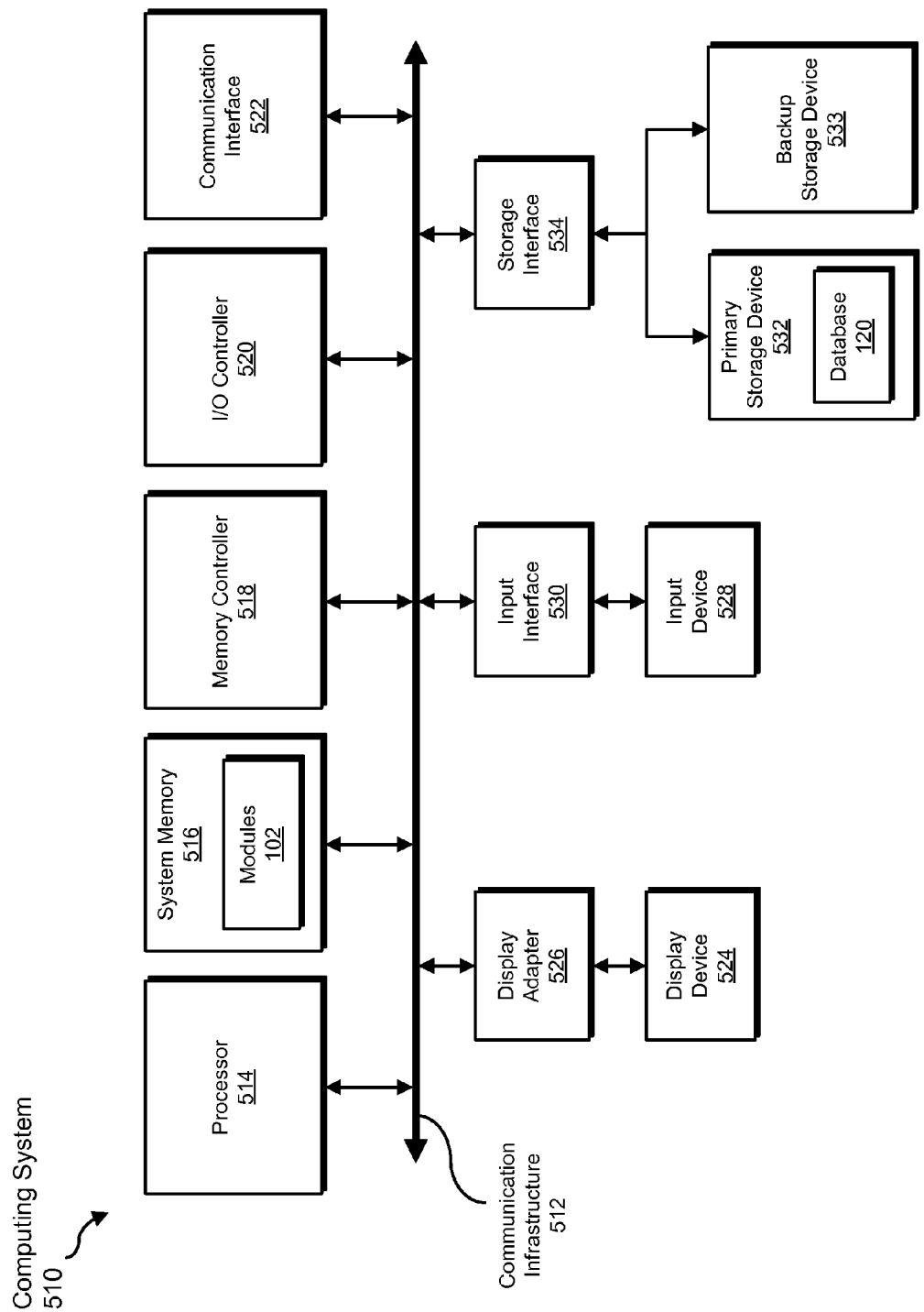
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, malware signature database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
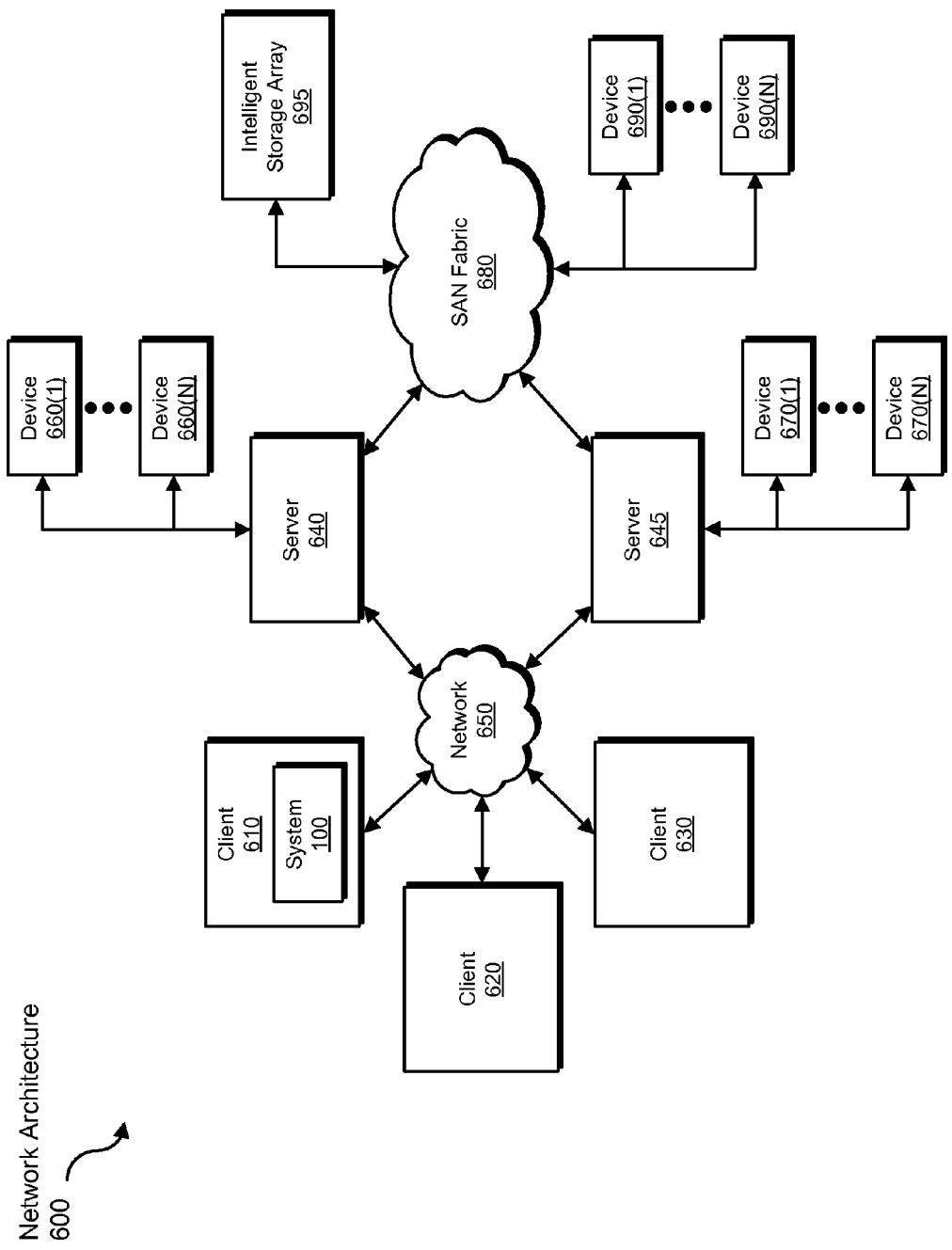
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690 (1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for pre-installation detection of malware on mobile devices.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform an application installation agent process by re-launching the application installation agent process so that a monitoring agent is able to monitor the application installation agent process. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for pre-installation detection of malware on mobile devices, at least a portion of the method being performed by a mobile computing device comprising at least one processor, the method comprising:
   intercepting one or more communications of an application installation agent that installs applications on the mobile computing device by:
      detecting, by a monitoring agent on the mobile computing device, an attempt to launch the application installation agent;
      interrupting, by the monitoring agent, the attempt to launch the application installation agent;
      re-launching the application installation agent as a process of the monitoring agent such that the monitoring agent is able to intercept communications from the application installation agent;
   identifying, based on the one or more intercepted communications, an application that has been at least partially downloaded by the application installation agent;
   in response to identifying the application, and before the application is installed on the mobile computing device, scanning the application for malware;
   determining, based on the scan, that the application contains malware;
   performing a security action in response to determining that the application contains malware.

2. The computer-implemented method of claim 1, wherein the monitoring agent sets permissions for the application installation agent that enable the monitoring agent to intercept the communications from the application installation agent.

3. The computer-implemented method of claim 1, wherein intercepting the one or more communications of the application installation agent comprises intercepting a request from the application installation agent to download the application from a remote server.

4. The computer-implemented method of claim 1, wherein intercepting the one or more communications of the application installation agent comprises intercepting a request by the application installation agent to install the application on the mobile computing device.

5. The computer-implemented method of claim 4, wherein identifying the application comprises identifying a file path for the application based on the request to install the application on the mobile computing device.

6. The computer-implemented method of claim 5, wherein identifying the application further comprises providing the file path to a scanning agent that performs the scanning step.

7. The computer-implemented method of claim 1, wherein scanning the application comprises at least one of:
   scanning the application while the application is downloading;
   scanning the application after the application has fully downloaded.

8. The computer-implemented method of claim 1, wherein performing the security action comprises blocking installation of the application.

9. A system for pre-installation detection of malware on mobile devices, the system comprising:
   an interception module, stored in memory, that intercepts one or more communications of an application installation agent that installs applications on a mobile computing device by:
      detecting, by a monitoring agent on the mobile computing device, an attempt to launch the application installation agent;
      interrupting, by the monitoring agent, the attempt to launch the application installation agent;
      re-launching the application installation agent as a process of the monitoring agent such that the monitoring agent is able to intercept communications from the application installation agent;
   an identification module, stored in memory, that identifies, based on the one more intercepted communications, an application that has been at least partially downloaded by the application installation agent;
   a scanning module, stored in memory, that scans the application before the application is installed on the mobile computing device;
   a determination module, stored in memory, that determines, based on the scan, that the application contains malware;
   a security module, stored in memory, that performs a security action in response to determining that the application contains malware;
   at least one physical processor that executes the interception module, the identification module, the scanning module, the determination module, and the security module.

10. The system of claim 9, wherein the monitoring agent sets permissions for the application installation agent that enable the monitoring agent to intercept the communications from the application installation agent.

11. The system of claim 9, wherein the interception module intercepts the one or more communications of the application installation agent by intercepting a request from the application installation agent to download the application from a remote server.

12. The system of claim 9, wherein the interception module intercepts the one or more communications of the application agent by intercepting a request by the application installation agent to install the application on the mobile computing device.

13. The system of claim 12, wherein the identification module identifies the application by identifying a file path for the application based on the request to install the application on the mobile computing device.

14. The system of claim 13, wherein the identification module provides the file path to the scanning module.

15. The system of claim 9, wherein the scanning module scans the application by scanning by the application while the application is downloading.

16. The system of claim 9, wherein the scanning module scans the application by scanning the application after the application has fully downloaded.

17. The system of claim 9, wherein the security module performs the security action by blocking installation of the application.

18. A non-transitory computer-readable medium comprising one or more computer-executable instructions that, when executed by at least one processor of a mobile computing device, cause the mobile computing device to:
   intercept one or more communications of an application installation agent that installs applications on the mobile computing device by:

detecting, by a monitoring agent on the mobile computing device, an attempt to launch the application installation agent;

interrupting, by the monitoring agent, the attempt to launch the application installation agent;

re-launching the application installation agent as a process of the monitoring agent such that the monitoring agent is able to intercept communications from the application installation agent;

identify, based on the one or more intercepted communications, an application that has been at least partially downloaded by the application installation agent;

scan the application for malware before the application is installed on the mobile computing device;

determine, based on the scan, that the application contains malware;

perform a security action in response to determining that the application contains malware.

19. The non-transitory computer-readable medium of claim 18, wherein the one or more computer-executable instructions cause the mobile computing device to:

intercept the one or more communications of the application installation agent by intercepting a request by the application installation agent to install the application on the mobile computing device;

identify the application by identifying a file path for the application based on the request to install the application on the mobile computing device.

20. The non-transitory computer-readable medium of claim 18, wherein the one or more computer-executable instructions cause the computing device to perform the security action by blocking installation of the application.

* * * * *